United States Patent [19]

Daboub et al.

[11] 4,146,175

[45] Mar. 27, 1979

[54] BAR CODE CONVERTER

[75] Inventors: Henry A. Daboub, Dallas; Chris A. Balthrop, Bedford; Charles R. Henderson, Grand Prairie, all of Tex.

[73] Assignee: E-Systems, Inc., Dallas, Tex.

[21] Appl. No.: 838,732

[22] Filed: Oct. 3, 1977

[51] Int. Cl.$^2$ .................. G06K 7/14; G06K 19/06
[52] U.S. Cl. .................................. 235/462; 235/494
[58] Field of Search ............ 235/462, 449; 340/146, 340/32, 347 DD; 360/40

[56] References Cited

U.S. PATENT DOCUMENTS

| | | | |
|---|---|---|---|
| 3,529,133 | 9/1970 | Kent et al. | 235/462 |
| 3,708,655 | 1/1973 | Schanne | 235/462 |
| 3,780,270 | 12/1973 | Faulkner et al. | 235/462 |
| 3,790,756 | 2/1974 | Graves et al. | 235/462 |
| 3,868,634 | 2/1975 | Dolch | 235/462 |

Primary Examiner—Daryl W. Cook
Attorney, Agent, or Firm—Robert V. Wilder

[57] ABSTRACT

Bar codes imprinted or otherwise applied to an object are read and decoded by focusing light reflected from the code by means of an object lens to a light responsive transducer. Electrical signals produced by the transducer are correlated and converted from a trinary code format into a binary code format. The trinary code utilizes bars and half bars made up of segments in one or more of four quadrants to represent a decimal equivalent number. This trinary code is applied to a converter where logic converts the trinary signals into equivalent binary signals which are then translated from a serial format into a parallel format for further processing by conventional binary code processors.

27 Claims, 6 Drawing Figures

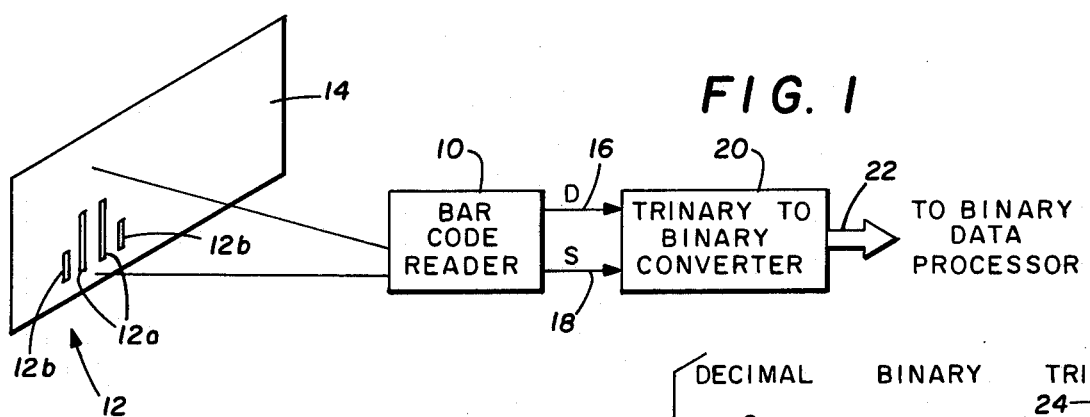
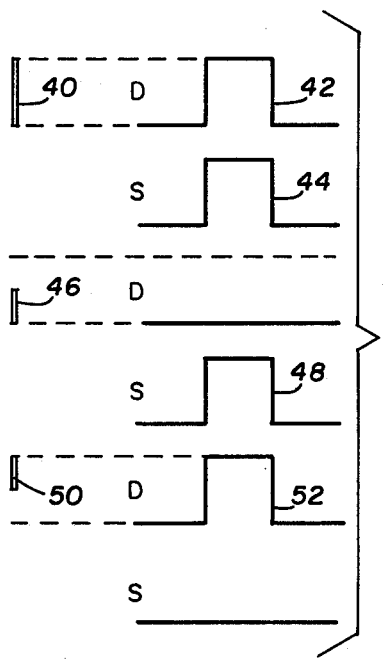
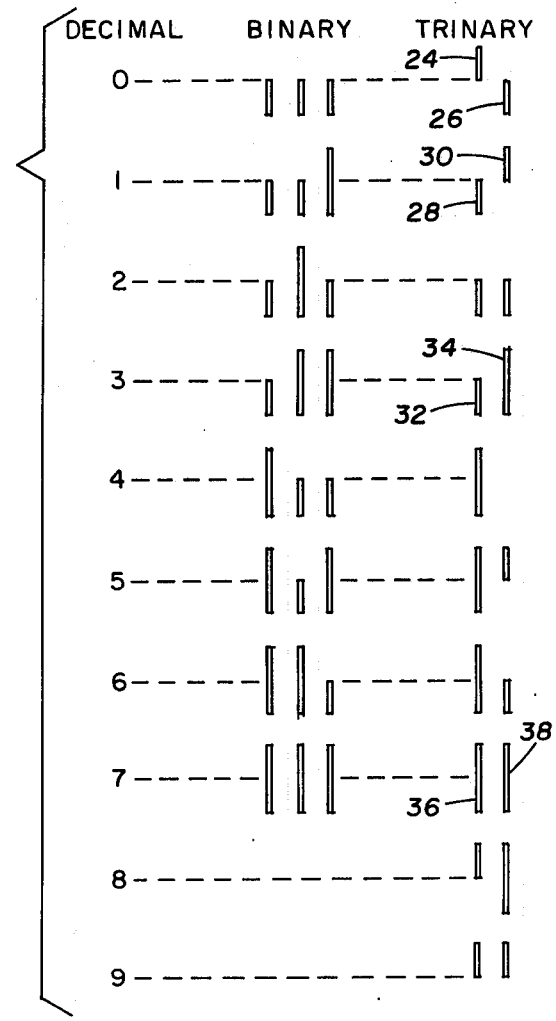
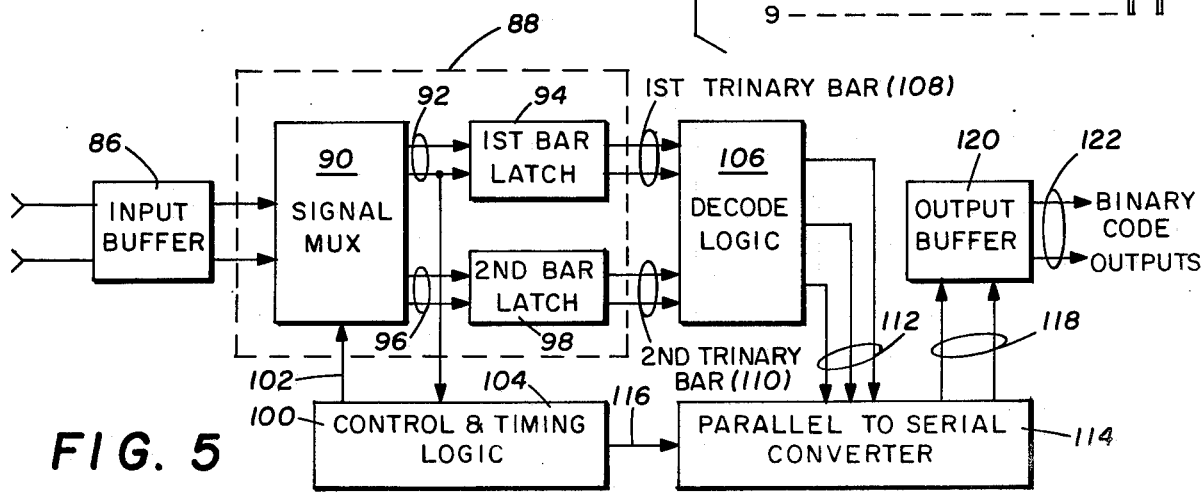

BAR CODE CONVERTER

This invention relates to a bar code and a converter therefor, and more particularly to a converter for bar codes in one format into bar codes of a second format.

A multiple bar code, such as the conventional three bar code, is normally read by an optical reader which scans the several bit patterns and transmits electrical signals representing the bars and spaces to a data processor which determines the decimal number represented by the pattern by comparing various bit arrangements to predetermined bit arrangements. Since such codes are applied by means of a high speed printer there may result surface distortions, ink spreads, etc., and the print quality leaves much to be desired. The timing of the printing of each bar is critical or the pitch (distance from bar to bar) will vary widely. Drag of the character slug of the printer on the paper as well as a small dirt particle between bars causes bridging and smudging thereby making the reading of such codes more difficult. These factors all combine to alter the values of the decimal number represented by the patterns.

When reading bar codes by means of an optical reader printing variations within a pattern can alter the number representation. Further, curvature and other distortions on the surface on which the bar codes are printed can produce variations in the apparent bar code format. Heretofore, scanning errors were observed when scanning the conventional three bar code with optical character readers. Numerous attempts have been made to compensate for the printing irregularities of the bar code, such as some form of thresholding decision capability which, in effect, decides which pattern exists between several theoretically correct possible patterns. Such thresholding techniques themselves, however, are subject to small errors.

Recent developments in data handling have further emphasized the need to quickly and accurately identify a bar code pattern for purposes of location, sortation and routing. For example, with the ever increasing volume of letter mail there is a need for rapid accurate mechanical identification and sorting to ensure rapid and accurate mail deliveries. Document identification and sortation is also becoming a significant problem in many industries such as banking and insurance where a significant volume of paper work must be processed daily on a reliable basis. The quick and accurate interpretation of data manifestations has also become important in fields where returnable media are utilized, such as the moving stock of railroads. Also, in the warehousing industry there is developing a need to quickly and accurately identify the location of stored items for retrieval thereof.

Industries requiring the handling of large volumes of documents are becoming increasingly more dependent on automatic sortation systems responding to coded data. The documents are processed in equipment that imparts a straight line motion to the document, but the transporting equipment may also press the document either mechanically or pneumatically against a cylinder rotating about an axis being parallel to the vertical orientation of the data. To accurately and reliably read and decode information from such documents requires a system that can recognize general patterns of coded data and not be restricted to clear sharply defined outlines.

In applications where coded information is utilized to sort returnable media and in the warehousing industry, the data manifestations are subject to rough usage and parts thereof are distorted if not destroyed. The overall data processing system, however, including the identification portion, must operate considerably more reliably than humans selected to perform that function. In applications where the encoded returnable media is in motion, the coded identifying system must be capable of identifying objects traveling at speeds ranging to sixty miles per hour or more. It is also necessary that the code detection system operate under extreme environmental conditions including wide ranges of temperature and may be subjected to vibration and shock. The operating tolerances of the bar code recognition system must provide accurate readouts in spite of the normal variation in height, side sway and inclination of the moving object.

A feature of the present invention is to provide a bar/half bar code in a format where only two adjacent spaces are utilized as compared to the three space requirement of previous codes, thereby increasing the accuracy and reliability of output data even when one or more of the above factors are present. The bar/half bar code of the present invention is read by a conventional optical reader and converted into standard three bar code signals for processing in presently available processing equipment such as described in U.S. Pat. No. 3,875,419. Another feature of the present invention is to provide a new and improved converter that responds to electrical signals representing the bar/half bar code adjacent space format and generates signals representing the conventional three bar format. Still another feature of the present invention is to provide a method for reading bar/half bar codes in adjacent space format for conversion into a three bar code format.

In accordance with the present invention, the method of converting bar code signals of a first pattern into bar code signals of a second pattern, the first pattern having four bar segment positions, includes the first step of decoding the bar code signals for the first pattern and generating a representation of a number in decimal equivalent when bar segments exist in selected segment positions. Next, a binary code signal is generated representing a decimal base number related to a bar segment pattern.

Further in accordance with the present invention, a converter for bar code signals representing a first pattern into bar code signals representing a second pattern includes a storing means for the bar code signals of the first pattern and a decoder responsive to the stored signals for generating the bar code signals of the second pattern.

Other and further features and advantages of the present invention will be apparent from the following description and claims and are illustrated in the accompanying drawings which, by way of illustration, show the embodiments of the present invention and the principles thereof in what is now considered to be the best modes contemplated for applying these principles.

Referring to the drawings:

FIG. 1 is a block diagram of a basic system for reading a trinary bar/half bar adjacent position code and generating binary data for further processing;

FIG. 2 is a chart showing the relationship between a decimal based number, a conventional three bar binary code and the trinary code of the present invention;

FIG. 3 illustrates the waveform relationships between a data pulse and a strobe pulse from the bar code reader of FIG. 1 for each of the three possible bar segment positions of the trinary code of FIG. 2;

Figure 4:
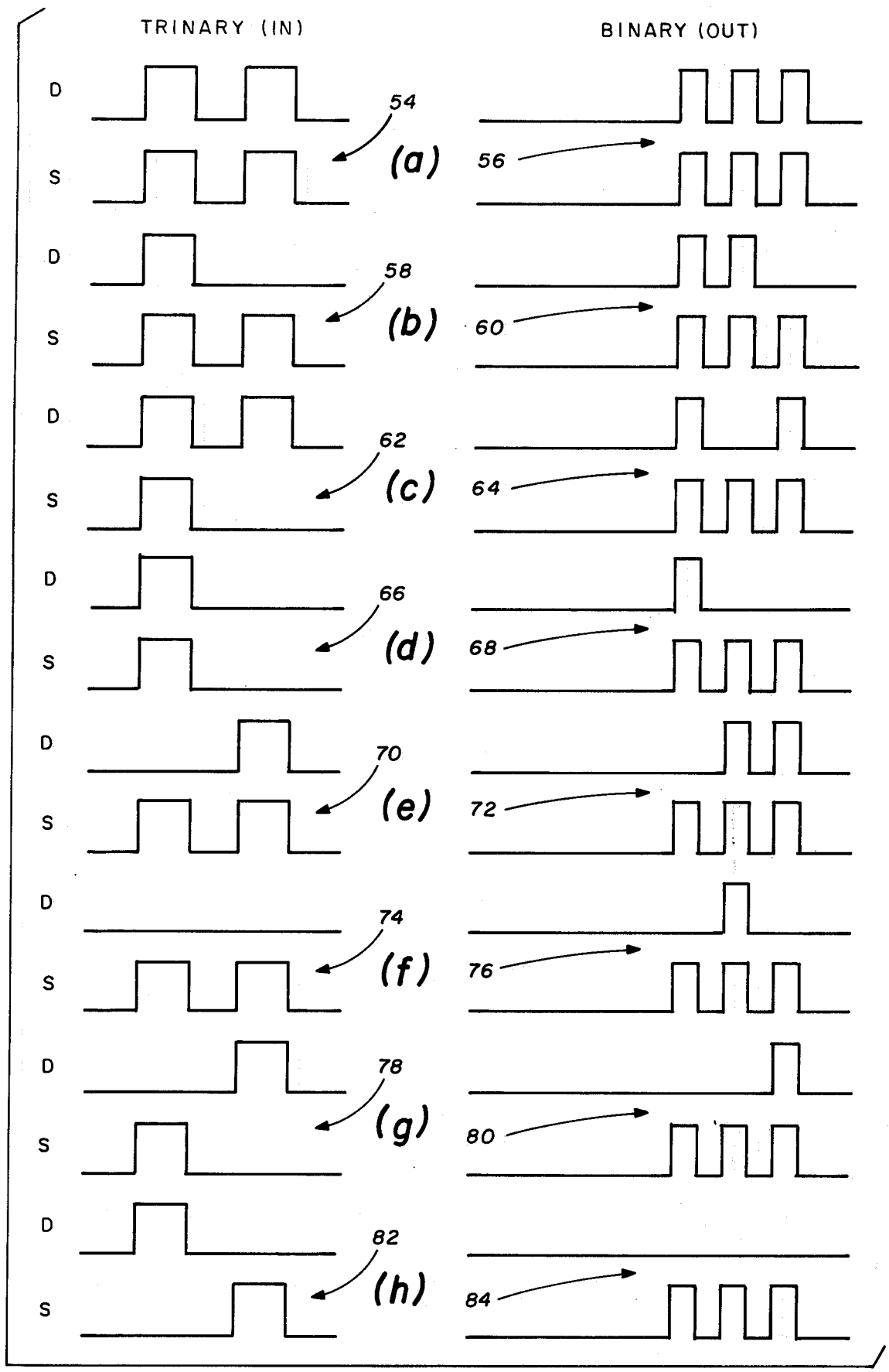
Figure 6:
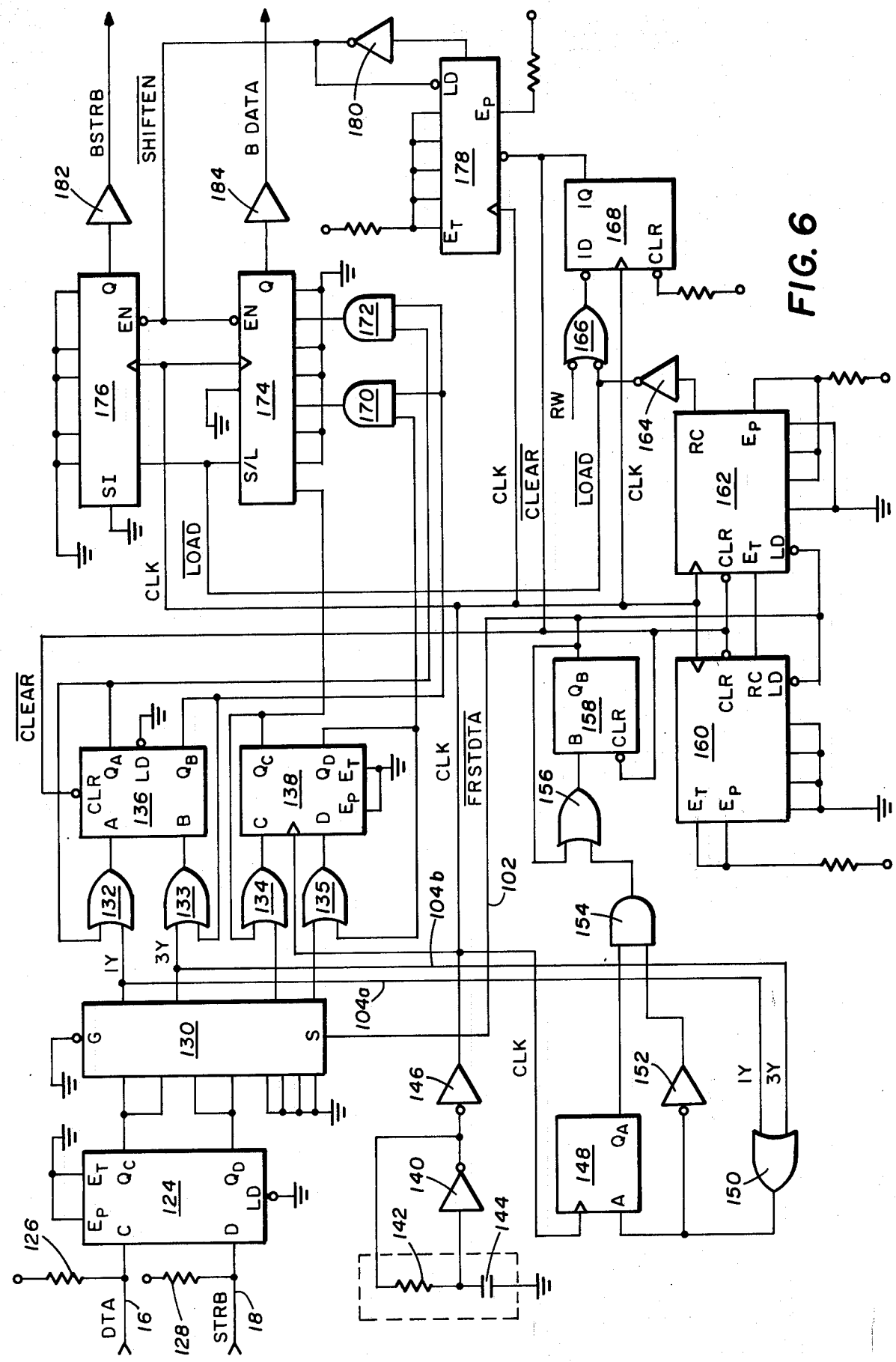

FIG. 4, consisting a a-h, is a series of illustrations of the data and strobe pulses from the bar code reader of FIG. 1 for decimal numbers 0-9 and associated binary pulse trains generated for downstream data processing;

FIG. 5 is a block diagram of the trinary-to-binary converter of FIG. 1 receiving the data and strobe pulses and generating a binary code output; and FIG. 6 is a detailed logic diagram for the trinary-to-binary converter of the present invention.

Referring to FIG. 1, there is shown an electro-optical bar code reader 10 that may use an image intensifier tube such as described in U.S. Pat. No. 3,875,419 as a sensor to detect both visible and near infrared energy reflected from a code 12 on a document 14 wherein the code comprises full bars 12a and half bars 12b and two bars comprise a pattern identifying a particular decimal based number.

The bar code reader 10 responds to reflections of light from the code 12 and generates a data pulse train (D) on a line 16 and a strobe pulse train (S) on a line 18. Conventional circuitry is employed in the bar code reader 10 to generate the data pulse train on the line 16 and the strobe pulse train on the line 18. These pulse trains are inputs to a trinary-to-binary converter 20 that responds thereto and generates a conventional binary data pulse train on a channel 22 for processing in accordance with standard techniques presently utilized.

Referring to FIG. 2, there is shown various bar code patterns with a cross reference to the decimal based number and the conventional three bar binary code. The trinary two bar adjacent position code has four segment positions in two adjacent columns. For example, decimal number zero has a half bar code 24 in an upper left bar segment position and a half bar code 26 in a lower right bar segment position. Decimal number one has a half bar code 28 in the lower left bar segment position and a half bar code 30 in the upper right bar segment position. When compared with the equivalent three bar binary code it will be evident from FIG. 2 that the spacing between adjacent bars is less critical thereby improving the resolution of a complete printed bar code 12, such as on the document 14. That is, in the same space that three bars must be printed for the conventional binary code the trinary code of FIG. 2 requires only two bar spaces.

Numbers 2-9 are also illustrated with each number being uniquely identified by combinations of full bar and half bar codes. With reference to decimal based number 3, the trinary code representation includes a half bar 32 in the lower left bar segment position and a full bar 34 covering both the upper and lower right bar segment positions. Other numbers include various combinations of bars and half bars with the number seven represented by full bars 36 and 38 covering all four bar segment positions. It will be understood that patterns illustrated in FIG. 2 may be varied, that is, the arrangement of half bar and full bars may be rearranged to identify the decimal numbers using different patterns.

Referring to FIG. 3, as the bar code reader 10 responds to the code 12 it generates data pulses on the line 16 and strobe pulses on the line 18 with the pattern of data pulse and strobe pulse representing bar and half bar codes. A full bar code 40 read by the bar code reader 10 generates a data pulse 42 on the line 16 and a strobe pulse 44 on the line 18. Thus, either of the full bars 12a will generate simultaneously appearing data and strobe pulses as shown in FIG. 3. For a half bar in either the left bar segment position or the right bar segment position, the bar code reader 10 generates a strobe pulse 48 while the data pulse line 16 remains at a zero signal level. For a half bar 50 in either of the upper bar segment positions, the bar code reader 10 produces a data pulse 52 on the line 16 while the strobe pulse line 18 has a zero signal level. The pulse pattern at any instant of time on the lines 16 and 18 thus identifies the possible bar code patterns.

Referring to FIG. 4, the pulse patterns of FIG. 3 are input to the trinary-to-binary converter 20 that generates binary pulse trains for further processing in conventional equipment. For decimal based number seven, the pulse pattern 54 of FIG. 4a is input to the trinary-to-binary converter 20 on the lines 16 and 18. The pulse pattern 54 includes sequentially appearing data pulses and also simultaneous and sequentially appearing strobe pulses. The trinary-to-binary converter 20 generates the binary code pattern at 56 that comprises three sequentially appearing data pulses and three simultaneous and sequentially appearing strobe pulses on the channel 22. With reference to FIG. 2, it will be noted that the binary representation of the decimal based number seven is three full bars corresponding to the six bar pattern 56 of FIG. 4a.

FIG. 4b shows a pulse pattern 58 appearing on the lines 16 and 18 for the decimal based number six as inputs to the trinary-to-binary converter 20. The converter 20 responding to the pattern 58 generates the binary code pattern 60 on the channel 22. Again reference may be made to FIG. 2 to equate the pattern 60 with the binary code representation of the decimal based number six.

Referring to FIG. 4c, there is shown a trinary two bar code pattern 62 for the decimal based number five as input to the converter 20 and the binary three bar code pattern 64 generated on the channel 22 for conventional processing.

FIG. 4d represents decimal based number four that comprises one full bar covering the two left bar segment positions as represented by the pattern 66 which is converted by the trinary-to-binary converter 20 into the binary code pattern 68 as a sequence of pulses on the data and strobe lines of the channel 22.

With reference to FIG. 4e, the trinary two bar code pattern 70 for decimal based number three is represented by the bars 32 and 34 of FIG. 2 and input to the converter 20. The converter generates an equivalent binary code pattern 72 on the channel 22.

FIG. 4f shows the trinary two bar code for decimal based number two in the pattern 74 and the output of the converter 20 as the conventional three bar binary code 76.

Decimal based number one is represented by the pulse pattern 78 in FIG. 4g as input to the converter 20 and is represented by the binary code pattern 80 appearing on the channel 22 at the output of the converter.

FIG. 4h illustrates the data and strobe pulses on the lines 16 and 18 by a pattern 82 for decimal based number zero and equivalent binary code pattern 84 generated at the output of the trinary-to-binary converter 20.

Referring to FIG. 5, there is shown a block diagram of the trinary-to-binary converter 20 responsive to the pulse patterns on the lines 16 and 18 and generating binary code data on the channel 22. Data pulses on the lines 16 and 18 are applied to the input buffer 86 and routed to the serial-to-parallel converter 88. The converter 88 comprises a signal multiplexer 90 having a first pair of output lines 92 connected to a first bar latch 94 and a second pair of output lines 96 connected to a second bar latch 98. The first bar latch 94 receives data and strobe pulses through the multiplexer 90 for the bar or half bar codes in the upper and lower left bar segment positions, while the second bar latch 98 receives data and strobe pulses through the multiplexer 90 for the bar and half bar codes in the right upper and lower bar segment positions.

Data and strobe pulses input to the buffer 86 are routed to the latches 94 and 98 by control and timing logic 100 that generates a bar select signal on a line 102 to the multiplexer 90 in response to a first bar transfer signal on a line 104 from the first bar latch 94.

Trinary two bar code pulses in the latches 94 and 98 are available to decode logic 106 over output lines 108 and 110, respectively. The decode logic 106 responds to the data and strobe pulses of the trinary two bar code and converts these pulses into three bar binary equivalents on three output lines 112. These three lines 112 are connected to a parallel-to-serial converter 114 that is clocked by a latch timing signal on a line 116 from the control and timing logic 100.

As evidenced by the waveforms of FIG. 4, the trinary-to-binary converter 20 operates in synchronism with the data and strobe pulses generated on the lines 16 and 18. This operation is required to assure that the correct pulse pattern for a particular decimal biased number is evaluated and converted in the trinary-to-binary converter 20.

Parallel data on the lines 112 input to the converter 114 is output as serial data on a pair of lines 118 to an output buffer 120 which connects to conventional processing equipment by means of a line pair 112. Thus, with the trinary-to-binary converter of FIG. 4 pulse data representing a trinary two bar code is input to the buffer 86 and pulse data representing a binary three bar code is output from the buffer 120.

Referring to FIG. 6, there is shown a logic block diagram wherein the data and strobe lines 16 and 18, respectively, are input to a flip-flop buffer 124. Each of the lines 16 and 18 is biased through resistors 126 and 128, respectively.

Data transferred into the flip-flop buffer 124 is applied to the signal multiplexer 90 that includes a register 130 and OR gates 132–135. Initially, the control logic 100 generates the bar select signal $\overline{\text{FRSTDTA}}$ on the line 102 to route the pulse signals to the first latch bar consisting of a flip-flop 136. The control logic 100 next generates a signal on the trailing edge of the first pulse of a code pair to the flip-flop 136 which switches the register 130 to transfer the second pulse through the gates 134 and 135 into the second latch consisting of a flip-flop 138.

Included in the control logic is a clock consisting of an amplifier 140 connected as an oscillator with an RC network consisting of a resistor 142 in series with a capacitor 144. The output frequency from the amplifier 140 is further amplified in an amplifier 146 that generates a clock signal CLK applied to various components of the converter 20.

Receiving the clock signal is a flip-flop 148 having an input connected to an OR gate 150 that receives the first pulse signals from the register 130 on the lines 104a and 104b. An output of the OR gate 150 is also applied through an inverter 152 to one input of a NAND gate 154 having a second input connected to the Q-terminal of the flip-flop 148. An output of the NAND gate 154 is applied to an OR gate 156 that connects to a flip-flop 158 having an output fed back to the second input of the OR gate 156.

The output of the flip-flop 158 is the first data signal $\overline{\text{FRSTDTA}}$ applied to the register 138 and also applied to the registers 160 and 162 of the control and timing logic. The registers 160 and 162 receive the clock signal from the amplifier 146 and function as the timer to generate the latch timing signals on the line 116. An output of the register 162 is applied through an inverter 164 that generates at its output the load signal $\overline{\text{LOAD}}$. This signal is applied to one input of a NOR gate 166 having a second input connected to a bias voltage.

An output of the NOR gate 166 is applied to a flip-flop 168 that generates at the Q-terminal the signal $\overline{\text{CLEAR}}$ that is used to reset the converter for a subsequent trinary two bar code. One connection to the Q-terminal of the flip-flop 168 is the clear terminals of the registers 160 and 162 that clears the timer for the next decoding sequence. Also input to the registers 160 and 162 is the first data signal $\overline{\text{FRSTDTA}}$ from the Q-terminal of the flip-flop 158.

With the transfer of the pulse for the first code bar into the latch 136 the registers 160 and 162 are released to begin a timing function for generating a delay equal to the time required for the second data pulse of the trinary code to be shifted into the flip-flop 138. This transfer of the second data pulse from the register 130 is initiated by the first data signal on the line 102.

At the end of the timeout established by the registers 160 and 162, trinary code data in the flip-flop 136 and 138 is decoded by NAND gates 170 and 172 and latched into registers 174 and 176 that comprise the parallel-to-serial converter 114.

At this time in the processing cycle, the output of the flip-flop 168, as applied to the flip-flop 136, clears the previously stored data and resets the signal multiplexer through the flip-flop 158 and also clears the timer of registers 160 and 162. The multiplexer and the first and second bar code latches are now reset to accept the next trinary bar code pair.

Also forming a part of the control and timing logic 100 is a register 178 generating a data shift signal $\overline{\text{SHIFT}}$ at the output of an inverter 180. Inputs to the register 178 include the clock signal from the amplifier 146 and the clear signal from the flip-flop 168.

When data is decoded by the NAND gates 170 and 172 and loaded into the registers 174 and 176 by the load signal $\overline{\text{LOAD}}$, the register 178 generates the strobe signal $\overline{\text{SHIFTEN}}$ that transfers the binary coded data through buffer amplifiers 182 and 184 making up the output buffer 120. An output of the buffer amplifier 182 is the binary strobe pulse and the output of the buffer amplifier 184 is the binary data pulse. Pulse trains appearing at the output of the buffer amplifiers 182 and 184 are typically shown in FIG. 4 at pulse patterns 56, 60, 64 and 68 for the decimal based numbers previously described. These binary data pulses are applied to following processing equipment of conventional design.

While only one embodiment of the invention, together with modifications thereof, has been described in detail herein and shown in the accompanying drawings, it will be apparent that various further modifications are possible without departing from the scope of the invention.

What is claimed is:

1. A method of converting the bar code signals of a first pattern into bar code signals of a second pattern, the first pattern having four bar segment positions, comprising the steps of:

decoding the bar code signals for the first pattern and generating a representation in decimal equivalent of bar segments in selected segment positions; and generating a binary code signal representing a decimal based number related to a bar segment pattern.

2. The method of converting bar code signals as set forth in claim 1 wherein the generated binary code signal represents the number zero in the decimal based system when the first pattern includes bar segments in the first and fourth bar segment positions.

3. The method of converting bar code signals as set forth in claim 1 wherein the generated binary code signal represents the number one in the decimal based system when the first pattern includes bar segments in the second and third bar segment positions.

4. The method of converting bar code signals as set forth in claim 1 wherein the generated binary code signal represents the number two in the decimal based system when the first pattern includes bar segments in the second and fourth bar segment positions.

5. The method of converting bar code signals as set forth in claim 1 wherein the generated binary code signal represents the number three in the decimal based system when the first pattern includes bar segments in the first, third and fourth bar segment positions.

6. The method of converting bar code signals as set forth in claim 1 wherein the generated binary code signal represents the number four in the decimal based system when the first pattern includes bar segments in the first and second bar segment positions.

7. The method of converting bar code signals as set forth in claim 1 wherein the generated binary code signal represents the number five in the decimal based system when the first pattern includes bar segments in the first, second and third bar segment positions.

8. The method of converting bar code signals as set forth in claim 1 wherein the generated binary code signal represents the number six in the decimal based system when the first pattern includes bar segments in the first, second and fourth bar segment positions.

9. The method of converting bar code signals as set forth in claim 1 wherein the generated binary code signal represents the number seven in the decimal based system when the first pattern includes bar segments in all four of the bar segment positions.

10. The method of converting bar code signals as set forth in claim 1 wherein the generated binary code signal represents the number eight in the decimal based system when the first pattern includes bar segments in the first, third and fourth bar segment positions.

11. The method of converting bar code signals as set forth in claim 1 wherein the generated binary code signal represents the number nine in the decimal based system when the first pattern includes bar segments in the first and third bar segment positions.

12. The method of converting bar code signals of a first pattern into bar code signals of a second pattern comprising the steps of:

decoding a bar code signal for a first bar position of the first pattern for the presence of a bar segment;

decoding a bar code signal for a second bar position of the first pattern for the presence of a bar segment;

decoding a third bar code signal for a third bar position of the first pattern for the presence of a bar segment;

decoding a bar code signal for a fourth bar position of the first pattern for the presence of a bar segment; and generating a binary code signal representing the second pattern related to the pattern of bar segments in the four bar positions.

13. The method of converting bar code signals as set forth in claim 12 including the step of storing the bar code signals for each segment prior to decoding.

14. The method of converting bar code signals as set forth in claim 12 including the step of storing the bar code signals for the first and second bar positions in a first memory and storing the bar code signals for the third and fourth bar positions in a second memory.

15. The method of converting bar code signals as set forth in claim 14 including the step of timing the decoding of the stored bar code signals to occur in the same time frame.

16. The method of converting bar code signals as set forth in claim 12 wherein the binary code signal is generated in a parallel format and including the step of converting the generated binary code signal into a series of binary code pulses.

17. The method of converting bar code signals as set forth in claim 16 including the steps of:

storing the bar code signals for each segment prior to decoding, and timing the storing of the bar code signals and the converting of the generated signals into a series of binary coded pulses.

18. Apparatus for converting bar code signals represented by a four bar segment pattern into binary code signals, comprising in combination:

means for storing the bar code signals of the four bar segment pattern, and decoder means responsive to stored bar code signals and generating binary code signals.

19. Apparatus as set forth in claim 18 wherein said means for storing includes a first memory for storing a first bar code signal of the four bar segment pattern and a second memory for storing a second bar code signal of the four bar segment pattern.

20. Apparatus as set forth in claim 19, including a multiplexer for alternately connecting the bar code signals to one of said memories.

21. Apparatus as set forth in claim 20 including a timer and controller for sequencing the operation of said multiplexer.

22. A converter for bar code signals representing a first pattern into bar code signals representing a second pattern, comprising in combination:

a serial-to-parallel converter responsive to the bar code signals representing the first pattern and having a parallel output representing the bar code signals in adjacent code positions;

decoder logic responsive to the parallel output of said converter and generating an equivalent bar code signal; and a parallel-to-serial converter responsive to the generated equivalent bar code signal of said decoder logic for converting the equivalent code into a binary code pulse train representing the second pattern.

23. A converter for bar code signals as set forth in claim 22 including control and timer logic for sequencing the operation of said converters.

24. A converter for bar code signals as set forth in claim 22 wherein said serial-to-parallel converter includes a first memory for storing a first bar code signal of the first pattern and a second memory for storing bar code signal of the first pattern, and a multiplexer responsive to the control and timing logic for alternately connecting the bar code signals representing the first pattern into said first and second memories.

25. A converter for bar code signals representing a first pattern into bar code signals representing a second pattern, comprising in combination:

a first memory for storing a first bar code signal of the first pattern, a second memory for storing a second bar code signal of the first pattern, a multiplexer for alternately connecting the bar code signals of the first pattern to one of said memories, and decoder means responsive to the stored bar code signals for generating bar code signals of the second pattern.

26. A converter for bar code signals as set forth in claim 25 including means for converting the generated bar code signals into a series of binary code pulses.

27. A converter for bar code signals as set forth in claim 26 including a timer and controller for sequencing the operation of said multiplexer.

* * * * *